United States Patent [19]
Cheek

[11] 3,802,289
[45] Apr. 9, 1974

[54] POWER TRANSFER DEVICE WITH REMOVABLY MOUNTED COVER

[75] Inventor: Michael E. Cheek, Oswego, Ill.

[73] Assignee: Caterpillar Tractor Co., Peoria, Ill.

[22] Filed: Feb. 8, 1973

[21] Appl. No.: 330,517

[52] U.S. Cl.................................. 74/411.5, 74/606
[51] Int. Cl......................... F16h 57/10, F16h 57/02
[58] Field of Search................... 74/411.5, 421, 606

[56] References Cited
UNITED STATES PATENTS
3,214,989   11/1965   Wellauer et al. ................. 74/606 X Primary Examiner—Leonard H. Gerin
Attorney, Agent, or Firm—Fryer, Tjensvold, Phillips & Lempio

[57] ABSTRACT

A power transfer device includes a pair of casing body portions which together form a casing having a plurality of shafts and gears therein which make up a gear train. The opposite ends of each shaft are rotatably supported relative to the respective casing body portions by bearings. One of the casing body portions defines a plurality of apertures, one aperture positioned adjacent an end of each shaft. A plurality of caps normally are fixed to these apertures to close the casing, but upon removal of these caps, a bolt may be applied through each aperture and threaded into a tapped hole in the end of each shaft, to fix each shaft relative to that casing body portion. Upon application of such bolts, the pair of casing body portions may be parted, it meanwhile being insured that the shafts are held in properly aligned position by such bolts upon such parting of the casing body portions.

6 Claims, 2 Drawing Figures

POWER TRANSFER DEVICE WITH REMOVABLY MOUNTED COVER

BACKGROUND OF THE INVENTION

This invention relates to a power transfer device, and more particularly, to such a power transfer device which includes means for fixing shafts therein relative to a removable casing cover thereof.

Conventional track roller frames of a track-type vehicle, such as an hydraulic excavator, frequently employ a final drive gear train to transmit power from a hydrostatic drive motor to a track driving sprocket. As the gear carrying shafts of the final drive are disposed horizontally when in the normal operating position, it is hazardous to remove the final drive cover when in this position because of the likelihood of the shafts slipping from their mounting bearings, if not restrained in some manner. Upon removal of such cover, it is also extremely difficult to reassemble the final drive because of the lack of any efficient method of manipulating the shafts for realignment with their respective mounting bearings. To alleviate these problems, it is customary to rotate the final drive to stand the shafts on their ends. However, this requires the complete removal of the final drive or, if integral with the track roller frame, the removal of the entire track roller frame from the vehicle. Obviously, this would necessitate a considerable amount of additional labor and time to disassemble the final drive.

SUMMARY OF THE INVENTION

It is an object of this invention to provide, in a power transfer device housing a plurality of shafts with gears mounted thereon, means for allowing the cover of the final drive and the shafts to be removed as an integral unit.

It is a further object of this invention to provide, in a power transfer device housing a plurality of shafts and gears mounted thereon, means which are sufficiently rigid to hold the shafts in proper alignment for reassembly of the final drive, i.e. application of the cover thereto.

It is a still further object of this invention to provide, in a power transfer device housing a plurality of shafts and gears mounted thereon, means which, while fulfilling the above objects, are simple in design and efficient in use.

Broadly stated, the invention is a power transfer device comprising a casing comprising first and second case body portions. Means are included for removably securing the first and second casing body portions together. A plurality of shafts are associated with the casing, each having one end rotatably supported relative to the first casing body portion and the other end rotatably supported relative to the second casing body portion. A plurality of gears are associated with the plurality of shafts. Such plurality of gears are interconnected to define a gear train. Means are included for selectively fixing at least one of the shafts relative to the first casing body portion, so that that shaft remains fixed relative to the first casing body portion upon removal of the first casing body portion from the second casing body portion, wherein the first casing body portion is removed from the second casing body portion.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
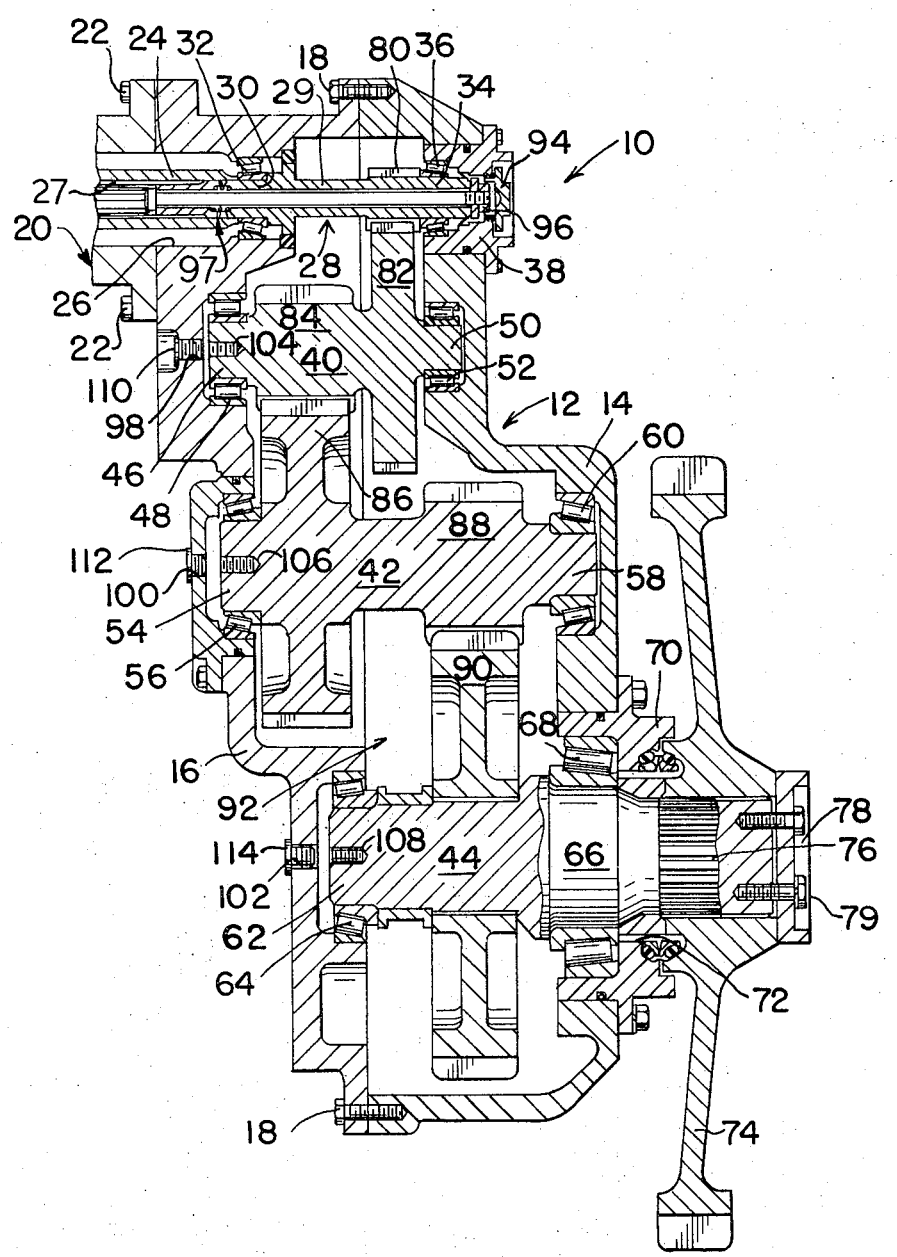
FIG. 1 is a sectional elevation of the power transfer device incorporating the invention, and with the cover thereof secured in place.

Shown in FIG. 1 is the inventive power transfer device 10, which in this embodiment is a final drive for a vehicle. such power transfer device 10 includes a casing 12 made up of a first casing body portion 14 and a removable casing body portion 16, which acts as a casing cover. The cover 16 is removably mounted to the casing body portion 14 by means of bolts 18, and the casing body portion 14 is secured to a track roller frame (not shown). A hydrostatic motor and brake assembly, partially shown at 20, is attached to the cover 16 by bolts 22. An output shaft 24 thereof extends through a passage 26 in the cover 16 and is coupled by a spline connection 27 to a drive mechanism 28. Such drive mechanism 28 includes an input shaft 29. One end 30 of the shaft 29 is rotatably supported relative to the casing body portion 16 by means of a bearing 32, and the other end 34 of the shaft 29 is rotatably supported relative to the casing body portion 14 by means of a two-piece bearing 36 mounted in a bearing cage 38 fixed to casing body portion 14 and considered a part of casing body portion 14.

Shafts 40, 42, 44 are associated with the casing 12. Shaft 40 has one end 46 rotatably supported relative to the casing body portion 16 by means of a bearing 48, and the other end 50 rotatably supported relative to the casing body portion 14 by means of a two-piece bearing 52. Shaft 42 similarly has one end 54 rotatably supported relative to the casing body portion 16 by means of a bearing 56, and the other end 58 rotatably supported relative to the casing body portion 14 by means of a two-piece bearing 60. Likewise, shaft 44 has one end 62 rotatably supported relative to the casing body portion 16 by means of a bearing 64, and the other end 66 rotatably supported relative to the casng body portion 14 by means of a two-piece bearing 68 mounted in a bearing cage 70 fixed to casing body portion 14, and considered a part of casing body portion 14.

The end 66 of shaft 44 extends through a passage 72 defined by bearing cage 70. A sprocket 74 is coupled by a splined connection 76 to end 66 of shaft 44 and retained by a plate 78 secured by bolts 79.

Shaft 29 has fixed thereto a gear 80, which is in engagement with a gear 82 defined by shaft 40 as an integral part thereof. Shaft 40 defines also a gear 84 as an integral part thereof, which is in engagement with a gear 86 defined by shaft 42. Shaft 42 also integrally defines a gear 88 which is in engagement with a gear 90 fixed to shaft 44. Such shafts and gears defined a gear train 92, as is well known. The shafts 29, 40, 42, 44 are disposed normally parallel to each other and are horizontally disposed in the operational mode of the power transfer device.

Drive mechanism 28 is selectively disconnectable from the output shaft 24 of the hydrostatic motor and brake assembly 20 generally by the removal of a plug 94 and the rotation of a nut 96 which causes the disengagement of a face-type gear coupling at 97. This avoids forcibly turning over the motor during towing of the vehicle to prevent possible consequent damage to the motor and its associated components. (See for example copending United States Patent application Ser. No. 311,823, filed on Dec. 4, 1972 and assigned to the assignee of this application.)

Casing body portion 16 defines threaded apertures 98, 100, 102 which are aligned with threaded bores 104, 106, 108 defined by ends 46, 54, 62 of shafts 40, 42, 44 respectively. In the operational mode of the power transfer device 10, caps 110, 112, 114 are normally threadably engaged with the apertures 98, 100, 102 respectively to close the casing 12.

Figure 2:
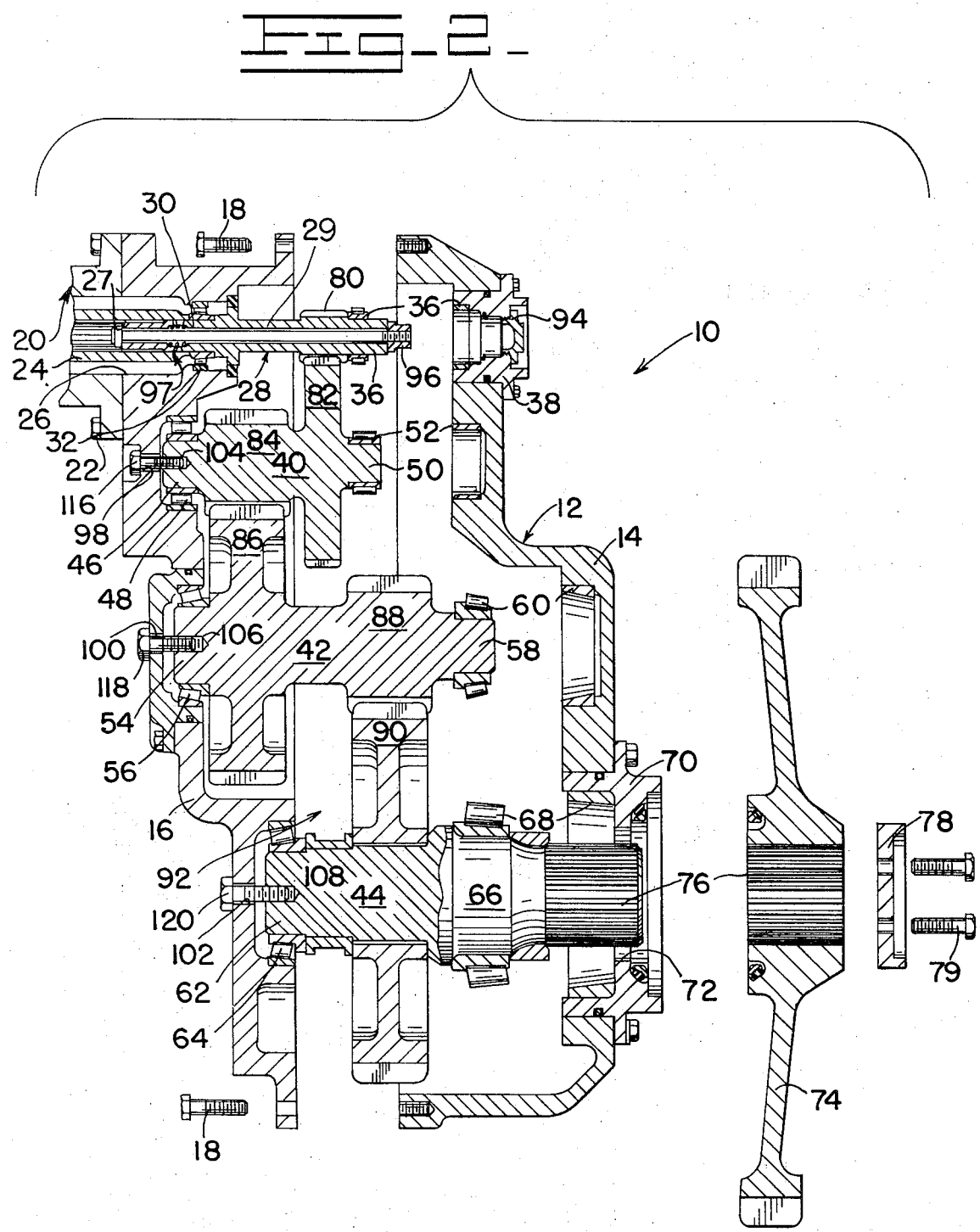
FIG. 2 is a sectional elevation similar to that shown in FIG. 1, but with the cover removed and with the shafts of the power train device secured thereto.

FIG. 2 shows the disassembly of the power transfer device 10. First, the drive sprocket 74 is removed from the end 66 of shaft 44 by the removal of retainer 78. Caps 110, 112, 114 are removed from apertures 98, 100, 102. Bolts 116, 118, 120 are then positioned in apertures 98, 100, 102 respectively (these apertures being larger in diameter than the diameter of the threaded portions of bolts 116, 118, 120), and turned to threadably connect with the threaded bores 104, 106, 108 respectively. Upon tightening of bolts 116, 118, 120, the bolts 18 may be safely removed from the cover 16 and all the shafts 29, 40, 42, 44 can be pulled away as a single unit.

Through such means, the shafts 29, 40, 42, 44 are fixed relative to the casing body portion 16 (i.e., the cover) in positions generally the same as their positions relative to the casing body portion 16 when the casing body portions 16, 14 are secured together and each shaft is properly positioned within the casing 12.

It should be noted that upon the removal of the casing body portion 16, the two pieces of the bearings 36, 52, 60, 68 are separated, leaving the outer races thereof mounted in the casing body portion 14 and the inner race and roller assemblies thereof mounted on their respective shafts. Thereafter, the cover 16 and shafts can be revolved to any position desired, independently of the casing body portion 14, to facilitate the servicing of the final drive. Upon the completion of repairs, the cover 16 and shafts 29, 40, 42, 44 can be expeditiously reassembled to the casing body portion 14 by reversing the above procedure. Such reassembly is made easier by the shafts being rigidly held in the casing body portion 16 to achieve the proper alignment of the shafts with their respective bearings in the casing body portion 14.

What is claimed is:

1. A power transfer device comprising:
a casing comprising first and second casing body portions;
means for removably securing the first and second casing body portions together;
a plurality of shafts associated with the casing, each having one end rotatably supported relative to the first casing body portion and the other end rotatably supported relative to the second casing body portion;
a plurality of gears associated with the plurality of shafts and interconnected to define a gear train; and
means for selectively fixing at least one of the shafts relative to the first casing body portion, so that said shaft (i) remains fixed relative to the first casing body portion upon removal of the first casing body portion from the second casing body portion, and (ii) is removed from the second casing body portion upon removal of the first casing body portion from the second casing body portion.

2. The power transfer device of claim 1 and further comprising means for selectively fixing each shaft relative to the first casing body portion, so that each shaft remains fixed relative to the first casing body portion upon removal of the first casing body portion from the second casing body portion, whereby each shaft is removed from the second casing body portion upon removal of the first casing body portion from the second casing body portion.

3. The power transfer device of claim 2 wherein each shaft is fixed relative to the first casing body portion in a position generally the same as its position relative to the first casing body portion when the first and second casing body portions are secured together, and each shaft has one end rotatably supported relative to the first casing body portion and the other end rotatably supported relative to the second casing body portion when the first and second casing body portions are secured together.

4. The power transfer device of claim 3 wherein the means for selectively fixing each shaft relative to the first casing body portion comprise a bolt positionable in an aperture in the first casing body portion and threadably connectable with a threaded bore defined by an end of that shaft.

5. The power transfer device of claim 4 and further comprising cap means normally fixed to the first casing body portion to close each aperture in the first casing body portion, and removable therefrom to allow positioning of said bolt therein.

6. The power transfer device of claim 5 wherein the shafts are disposed generally parallel to each other when the shaft ends are rotatably supported relative to the first and second casing body portions, and are held substantially in such positions when the shafts are fixed relative to the first casing body portion.

\* \* \* \* \*